(12) United States Patent
Kawamura (10) Patent No.: US 10,438,327 B2
(45) Date of Patent: *Oct. 8, 2019

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Takahiro Kawamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 15/658,403

(22) Filed: Jul. 25, 2017

(65) Prior Publication Data

US 2018/0068422 A1    Mar. 8, 2018

(30) Foreign Application Priority Data

Sep. 8, 2016 (JP) .................. 2016-175456

(51) Int. Cl.
   *G06K 5/02*    (2006.01)
   *G06T 5/00*    (2006.01)
   *G06T 5/50*    (2006.01)

(52) U.S. Cl.
   CPC ............... *G06T 5/002* (2013.01); *G06T 5/50* (2013.01); *G06T 2207/10116* (2013.01);
   (Continued)

(58) Field of Classification Search
   CPC ..................... G06T 7/0012; G06T 5/50; G06T 2207/20182; G06T 5/002;
   (Continued)

(56) References Cited

U.S. PATENT DOCUMENTS 5,072,119 A * 12/1991 Yamaguchi ........ H04N 1/40056
                                                          250/588
5,477,059 A    12/1995 Arakawa
(Continued)

FOREIGN PATENT DOCUMENTS

EP    0677780    10/1995
EP    1014695    6/2000
(Continued)

OTHER PUBLICATIONS

Office Action of Japan Counterpart Application, with English translation thereof, issued on May 28, 2019, pp. 1-8.

*Primary Examiner* — Jingge Wu
(74) *Attorney, Agent, or Firm* — JCIPRNET (57) ABSTRACT

An image acquisition unit acquires first and second radiation images from first and second radiation detectors. A first frequency analysis unit generates a first high-frequency component which is a high-frequency component of the first radiation image, and a second frequency analysis unit generates a second high-frequency component and a second low-frequency component which are a high-frequency component and a low-frequency component of the second radiation image. An addition processing unit performs weighting and addition with respect to the first and second high-frequency components to generate an addition high-frequency component, and a synthesis unit synthesizes the addition high-frequency component and the second low-frequency component to generate a processed image.

8 Claims, 5 Drawing Sheets

(52) U.S. Cl.
CPC ............... *G06T 2207/20064* (2013.01); *G06T 2207/20182* (2013.01); *G06T 2207/20216* (2013.01); *G06T 2207/30008* (2013.01); *G06T 2207/30012* (2013.01)

(58) Field of Classification Search
CPC ........... G06T 2207/20221; G06T 5/003; G06T 11/003; G06T 2207/10081; G06T 2207/10116; A61B 1/00009; A61B 1/00016; A61B 1/00045; A61B 1/0005; A61B 1/00096; A61B 1/04; A61B 1/043; A61B 1/0638; A61B 1/0661; A61B 1/3132; A61B 6/032; A61B 6/501; A61B 6/5211; A61B 6/5258; H04N 5/23229
See application file for complete search history.

(56) References Cited

U.S. PATENT DOCUMENTS

| | | | | |
|---|---|---|---|---|
| 2005/0185830 | A1* | 8/2005 | Sasada | G06T 5/50 382/130 |
| 2008/0122953 | A1* | 5/2008 | Wakahara | G06T 5/10 348/241 |
| 2008/0285836 | A1* | 11/2008 | Ogawa | A61B 6/032 382/132 |
| 2009/0060312 | A1* | 3/2009 | Kitamura | G06T 5/50 382/132 |
| 2009/0304151 | A1* | 12/2009 | Yamada | G06T 5/002 378/62 |
| 2009/0324135 | A1* | 12/2009 | Kondo | G06T 3/4038 382/284 |
| 2011/0235888 | A1* | 9/2011 | Takahashi | A61B 6/5205 382/132 |
| 2011/0280463 | A1* | 11/2011 | Takahashi | A61B 6/5205 382/132 |
| 2013/0235236 | A1* | 9/2013 | Kobayashi | H04N 5/361 348/243 |
| 2014/0363071 | A1* | 12/2014 | Imai | A61B 6/4291 382/132 |
| 2015/0193948 | A1* | 7/2015 | Kawamura | A61B 6/5264 382/132 |
| 2015/0302615 | A1* | 10/2015 | Fukuda | A61B 6/025 378/19 |
| 2015/0379711 | A1* | 12/2015 | Imai | A61B 6/5282 382/132 |
| 2016/0253782 | A1* | 9/2016 | Aoki | G06T 3/4053 382/168 |
| 2016/0253783 | A1* | 9/2016 | Higashi | G06T 3/4053 382/168 |
| 2016/0364856 | A1* | 12/2016 | Zheng | A61B 6/032 |
| 2017/0055933 | A1* | 3/2017 | Kawamura | A61B 6/5282 |
| 2018/0068442 | A1* | 3/2018 | Kawamura | G06T 7/0012 |

FOREIGN PATENT DOCUMENTS

| | | |
|---|---|---|
| JP | H07-159910 | 6/1995 |
| JP | H07-287330 | 10/1995 |
| JP | H07-319092 | 12/1995 |
| JP | H1013740 | 1/1998 |
| JP | H11313205 | 11/1999 |
| JP | 2006041744 | 2/2006 |
| JP | 2009054013 | 3/2009 |
| JP | 2010081997 | 4/2010 |
| JP | 2016062271 | 4/2016 |

* cited by examiner

IMAGE PROCESSING APPARATUS, IMAGE PROCESSING METHOD, AND IMAGE PROCESSING PROGRAM

CROSS REFERENCE TO RELATED APPLICATIONS

The present application claims priority under 35 U.S.C. § 119 to Japanese Patent Application No. 2016-175456 filed on Sep. 8, 2016. The above application is hereby expressly incorporated by reference, in its entirety, into the present application.

BACKGROUND

Field of the Invention

The present invention relates to an image processing apparatus, an image processing method, and an image processing program for performing a weighting addition process with respect to two radiation images.

Related Art

In the related art, a variety of diagnosis has been performed using a radiation image. In this regard, a radiation image addition process of reducing quantum noise (hereinafter, referred to as noise) of radiation included in a radiation image has been proposed to enhance diagnosis performance. The addition process is performed by acquiring a radiation image from each detection means such as a plurality of radiation detectors that are disposed in an overlapping manner and adding the plurality of radiation images between corresponding pixels. By performing such an addition process, it is possible to acquire a high-quality addition image with the S/N ratio in which noise is reduced.

Further, in the addition process, a variety of techniques for acquiring a processed image with high quality have been proposed. For example, JP1995-159910A (JP-H07-159910A) has proposed a technique for changing addition rates of two radiation images according to the amount of radiation in imaging, the kind of detection means, a frequency to be focused in a radiation image, and the like to generate an addition image in which the S/N ratio becomes a maximum. Further, JP1995-287330A (JP-H07-287330A) has proposed a technique for calculating a mask filter having a frequency characteristic for enhancing the S/N ratio of an addition image on the basis of the amount of radiation, and performing convolution with respect to each radiation image using the mask filter to obtain an addition image. Furthermore, JP1995-319092A (JP-H07-319092A) has proposed a technique for resolving frequencies of two radiation images to be added, performing addition using different addition rates for each frequency band, and performing demultiplexing resolution conversion with respect to the addition image for each frequency band to obtain an addition image.

In order to achieve two radiation images for performing the above-mentioned addition process, a two-shot method in which imaging is performed two times, and a one-shot method in which two detection means that are disposed in an overlapping manner are simultaneously irradiated with radiation that passes through a subject so that the two radiation images are simultaneously acquired are known.

SUMMARY

In a case where two radiation images are acquired using the one-shot method, detection means that is disposed on a side closer to a radiation source has a large amount of irradiated radiation compared with in detection means that is disposed on a side more distant from the radiation source. Thus, a radiation image acquired by the detection means that is disposed on the side closer to the radiation source has a small amount of noise component. On the other hand, in a case where imaging is performed with respect to a portion including a portion having a large body thickness, for example, in imaging of a lumbar spine, in imaging of a hip joint shaft portion, or in imaging of a cervical spine side surface including the shoulder, it is necessary to set the amount of radiation to be emitted to be large. However, in a case where the amount of radiation is set to be large, in a portion in which the body thickness is small, for example, in a skin line portion, there is a concern that the amount of radiation emitted to the detection means exceeds a maximum detection amount of radiation of the detection means. In a case where the amount of radiation exceeds the maximum detection amount of radiation of the detection means, the density of the portion in which the body thickness is small in the radiation image is saturated to cause black crushing.

Further, in the detection means that is disposed on the side more distant from the radiation source, since the arrival amount of radiation is smaller than that of the detection means which is disposed on the side closer to the radiation source, in an acquired radiation image, there is no case where a pixel value in a portion having a small body thickness is saturated to cause black crushing. However, since the amount of radiation is insufficient in a portion having a large body thickness which becomes a main region of interest, granulation of the radiation image is poor to cause a large amount of noise. Thus, in the radiation image acquired by the detection means that is disposed on the side more distant from the radiation source, it is difficult to diagnose a main region of interest.

In addition, in a case where two radiation images are acquired using the two-shot method, in order to reduce an exposure dose to the subject, the amount of radiation emitted to the subject in the first imaging is reduced compared with the second imaging. Thus, in a case where two radiation images are acquired by performing imaging of a portion having a large body thickness using the two-shot method, in a radiation image acquired by the first imaging, the density of a portion having a small body thickness is saturated to be crushed to black, as in the radiation image acquired by the detection means on the side closer to the radiation source, acquired by the one-shot method. Further, a radiation image acquired by the second imaging has a large amount of noise due to shortage of the amount of radiation, although loss of information on a subject due to black crushing, or the like, as in the radiation image acquired by the detection means on the side more distant from the radiation source acquired by the one-shot method, does not occur.

In consideration of the above problems, an object of the invention is to provide an image processing apparatus, an image processing method, and an image processing program for performing an addition process with respect to radiation images, capable of reducing noise and acquiring an image having a wide observable density range while reducing noise.

According to an aspect of the invention, there is provided an image processing apparatus comprising: image acquisition unit for acquiring two radiation images obtained by radiation rays passed through a subject, having different amounts of radiation; first frequency analysis unit for generating a first high-frequency component which is a high-frequency component of a first radiation image acquired by radiation having a large amount of radiation among the two radiation images; second frequency analysis unit for generating a second high-frequency component which is a high-frequency component of a second radiation image acquired by radiation having a small amount of radiation among the two radiation images and a second low-frequency component which is a low-frequency component of the second radiation image; addition unit for performing weighting and addition between corresponding pixels with respect to the first high-frequency component and the second high-frequency component to generate an addition high-frequency component; and synthesis unit for synthesizing the addition high-frequency component and the second low-frequency component to generate a processed image.

In the case of a one-shot method, two detection unit that are disposed in an overlapping manner are irradiated with radiation passed through a subject. Thus, detection unit on a side more distant from a radiation source has a small amount of emitted radiation compared with detection unit on a side closer to the radiation source. Accordingly, in the one-shot method, between a radiation image obtained by the detection unit on the side closer to the radiation source and a radiation image obtained by the detection unit on the side more distant from the radiation source, the amounts of radiation are different from each other. On the other hand, in the case of a two-shot method, by using radiation having a small amount of radiation in the second imaging compared with the first imaging, it is possible to set the amounts of radiation to be different from each other between a radiation image obtained by the first imaging and a radiation image obtained by the second imaging. Thus, in the invention, two radiation images can be acquired by either of the one-shot method or the two-shot method.

In the image processing apparatus according to this aspect of the invention, the addition unit may set a weighting coefficient in performing the weighting and addition on the basis of a pixel value of the first radiation image.

In the image processing apparatus according to this aspect of the invention, the addition unit may set the weighting coefficient to 0 with respect to a pixel value corresponding to a pixel value that exceeds a saturated pixel value in the first radiation image and may set the weighting coefficient to 1 with respect to a pixel value corresponding to a pixel value that is equal to or smaller the saturated pixel value in the first radiation image, with respect to the first high-frequency component.

In this case, the addition unit may gradually change the weighting coefficient in the vicinity of the saturated pixel value.

Further, in the image processing apparatus according to this aspect of the invention, the addition unit may set the weighting coefficient in performing the weighting and addition on the basis of a characteristic of a detection unit for acquiring the first radiation image.

Further, in the image processing apparatus according to this aspect of the invention, the first frequency analysis unit may generate the first high-frequency component in a frequency band according to an imaging portion of the subject, and the second frequency analysis unit may generate the second high-frequency component and the second low-frequency component in a frequency band according to an imaging portion of the subject.

According to another aspect of the invention, there is provided an image processing method comprising: acquiring two radiation images obtained by radiation rays passed through a subject, having different amounts of radiation; generating a first high-frequency component which is a high-frequency component of a first radiation image acquired by radiation having a large amount of radiation among the two radiation images; generating a second high-frequency component which is a high-frequency component of a second radiation image acquired by radiation having a small amount of radiation among the two radiation images and a second low-frequency component which is a low-frequency component of the second radiation image; performing weighting and addition between corresponding pixels with respect to the first high-frequency component and the second high-frequency component to generate an addition high-frequency component; and synthesizing the addition high-frequency component and the second low-frequency component to generate a processed image.

According to still another aspect of the invention, a program for causing a computer to execute the image processing method according to the above-described aspect of the invention may be provided.

According to the invention, a first high-frequency component which is a high-frequency component of a first radiation image acquired by radiation having a large amount of radiation among two radiation images is generated, and a second high-frequency component and a second low-frequency component of a second radiation image acquired by radiation having a small amount of radiation among the two radiation images are generated. Further, weighting and addition are performed between corresponding pixels with respect to the first high-frequency component and the second high-frequency component to generate an addition high-frequency component, and the addition high-frequency component and the second low-frequency component are synthesized to generate a processed image.

Here, since the first radiation image is acquired by a large amount of radiation, a noise component is small, but there is a possibility that pixel values are saturated to cause black crushing or halation. Thus, the first high-frequency component which is a high-frequency component of the first radiation image has a small amount of noise, but information on a subject in a portion where the pixel values are saturated is lost. On the other hand, since the second radiation image is acquired by a small amount of radiation, pixel values are not saturated, but granulation is poor in a portion where the body thickness of the subject is large, and thus, a large amount of noise is included therein. Thus, the second high-frequency component which is a high-frequency component of the second radiation image has a large amount of noise components, but information on the subject is not lost. Accordingly, by performing weighting and addition between corresponding pixels with respect to the first high-frequency component and the second high-frequency component, it is possible to set a weight of the first high-frequency component to be smaller than that of the second high-frequency component in a pixel that is saturated in the first radiation image, and to set a weight of the first high-frequency component to be larger than that of the second high-frequency component in pixels other than the above-mentioned pixel. Thus, it is possible to enlarge a dynamic range of the first radiation image with respect to the amount of emitted radiation, and consequently, it is possible to generate an addition high-frequency component in which loss of a high-frequency component due to saturation is reduced, having a small amount of noise components. Further, by synthesizing the addition high-frequency component and the second low-frequency component, it is possible to generate a processed image having both of an advantage of the first radiation image and an advantage of the second radiation image, that is, having a wide observable density range, with a small amount of noise in a pixel that is not saturated and with no influence due to saturation.

DETAILED DESCRIPTION

Figure 1:
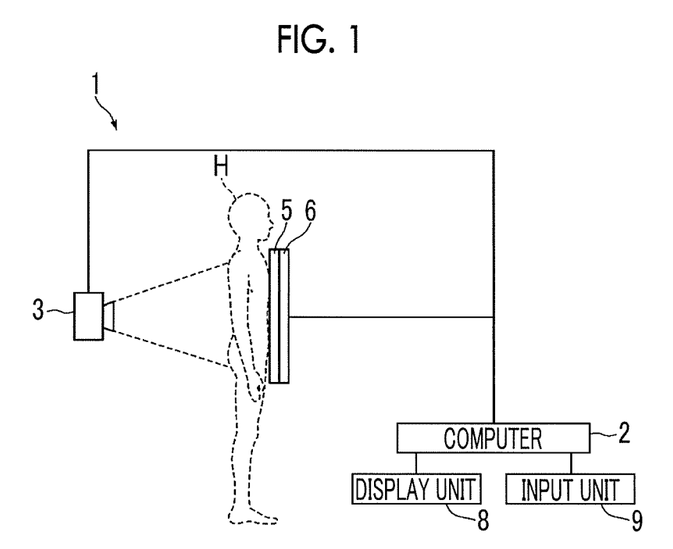
FIG. 1 is a block diagram showing a schematic configuration of a radiation imaging system to which an image processing apparatus according to an embodiment of the invention is applied.

Hereinafter, embodiments of the invention will be described with reference to the accompanying drawings. FIG. 1 is a block diagram showing a schematic configuration of a radiation imaging system to which an image processing apparatus according to an embodiment of the invention is applied. As shown in FIG. 1, the radiation imaging system according to the embodiment captures two radiation images, and performs a weighting addition process using the two radiation images. The radiation imaging system includes an imaging apparatus 1, and a computer 2 that includes the image processing apparatus according to this embodiment.

The imaging apparatus 1 is an imaging apparatus for performing a so-called one-shot method for irradiating a first radiation detector 5 and a second radiation detector 6 with X-rays emitted from an X-ray source 3 which is a radiation source and passed through a subject H. In imaging, as shown in FIG. 1, the first radiation detector 5 and the second radiation detector 6 are disposed sequentially from a side closer to the X-ray source 3, and then, the X-ray source 3 is driven. The first and second radiation detectors 5 and 6 are brought into close contact with each other.

Thus, in the first radiation detector 5, a first radiation image G1 of the subject H is acquired. Further, in the second radiation detector 6, a second radiation image G2 of the subject H is acquired. The first and second radiation images are input to the computer 2 which is an image processing apparatus. Since the first radiation detector 5 among the first radiation detector 5 and the second radiation detector 6 is disposed on the side closer to the X-ray source 3, the first radiation image G1 is acquired by X-rays with a large amount of radiation and the second radiation image G2 is acquired by X-rays with a small amount of radiation.

The first and second radiation detectors 5 and 6 are able to repeat recording and reading of radiation images. The first and second radiation detectors 5 and 6 may be a so-called direct type radiation detector that directly receives emission of radiation to generate electric charges, or may be a so-called indirect type radiation detector that converts visible light into an electric charge signal. Further, it is preferable that a reading method of a radiation image signal is a so-called thin film transistor (TFT) reading method for switching on and off a TFT switch to read a radiation image signal, or may be a so-called optical reading method for reading a radiation image signal with irradiation of reading light, but the reading method is not limited thereto and may be other methods.

A display unit 8 and an input unit 9 are connected to the computer 2. The display unit 8 includes a cathode ray tube (CRT), a liquid crystal display, or the like, and performs assistance of a radiation image acquired through imaging and a variety of inputs necessary for processes performed in the computer 2. The input unit 9 includes a keyboard, a mouse, a touch panel, or the like.

An image processing program of this embodiment is installed in the computer 2. In this embodiment, the computer 2 may be a work station or a personal computer that is directly operated by an operator, or may be a server computer that is connected thereto through a network. The image processing program may be recorded on a recording medium such as a digital versatile disc (DVD) or a compact disc read only memory (CD-ROM) for distribution, and may be installed into the computer from the recording medium. Alternatively, the image processing program may be stored in a storage device of a server computer connected to a network or a network storage in an accessible state from the outside, and may be downloaded into the computer as necessary for installation.

Figure 2:
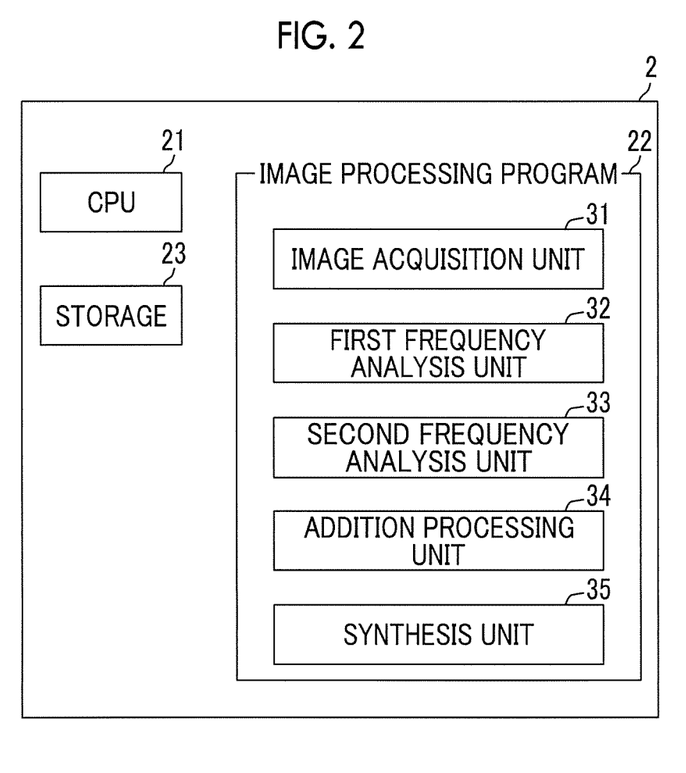
FIG. 2 is a diagram showing a schematic configuration of the image processing apparatus according to the embodiment.

FIG. 2 is a diagram showing a schematic configuration of an image processing apparatus realized by installing an image processing program in the computer 2 in this embodiment. As shown in FIG. 2, the image processing apparatus includes a central processing unit (CPU) 21, a memory 22, and a storage 23 as components of a standard computer.

The storage 23 includes a storage device such as a hard disk or a solid state drive (SSD), and stores a variety of information including a program and an image processing program for driving respective units of the imaging apparatus 1. The storage 23 also stores a radiation image acquired through imaging.

A program or the like stored in the storage 23 is temporarily stored in the memory 22 in order to cause the CPU 21 to execute various processes. The image processing program defines, as processes to be executed by the CPU 21, an image acquisition process of causing the imaging apparatus 1 to perform imaging to acquire the first and second radiation images G1 and G2, a first frequency analysis process of generating a first high-frequency component GH1 which is a high-frequency component of the first radiation image G1 acquired by the first radiation detector 5 which is disposed on the side closer to the X-ray source 3, that is, acquired by X-rays having a large amount of radiation, a second frequency analysis process of generating a second high-frequency component GH2 and a second low-frequency component GL2 which are a high-frequency component and a low-frequency component of the second radiation image G2 acquired by the second radiation detector 6 which is disposed on the side more distant from the X-ray source 3, that is, acquired by X-rays having a small amount of radiation, an addition process of performing weighting and addition between corresponding pixels with respect to the first high-frequency component GH1 and the second high-frequency component GH2 to generate an addition high-frequency component GHa, and a synthesis process of synthesizing the addition high-frequency component GHa and the second low-frequency component GL2 to generate a processed image Gs.

Further, as the CPU 21 executes these processes according to the image processing program, the computer 2 functions as an image acquisition unit 31, a first frequency analysis unit 32, a second frequency analysis unit 33, an addition processing unit 34, and a synthesis unit 35. The computer 2 may include a processor or a processing circuit that performs the first frequency analysis process, the second frequency analysis process, the addition process, and the synthesis process, respectively.

The image acquisition unit 31 drives the X-ray source 3 to irradiate the subject H with X-rays, detects the X-rays that pass through the subject H using the first and second radiation detectors 5 and 6, and acquires the first and second radiation images G1 and G2. The first and second radiation images G1 and G2 may be acquired using a separate program other than the image processing program, and may be stored in the storage 23. In this case, the image acquisition unit 31 reads the first and second radiation images G1 and G2 stored in the storage 23 from the storage 23 for image processing of the first and second radiation images G1 and G2.

Figure 3:
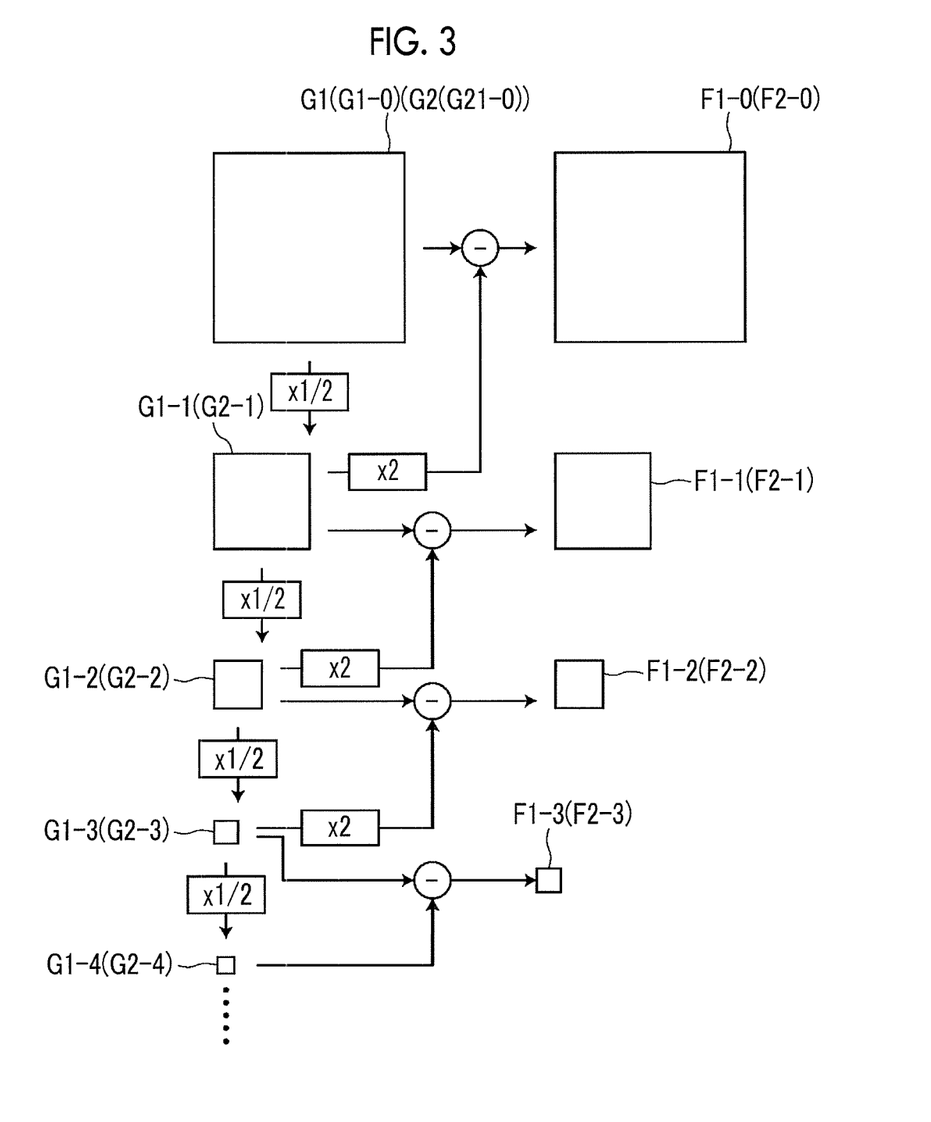
FIG. 3 is a diagram showing frequency resolution performed by a first frequency analysis unit.

The first frequency analysis unit 32 generates a first high-frequency component GH1 which is a high-frequency component of the first radiation image G1. The first frequency analysis unit 32 resolves a frequency of the first radiation image G1 to generate a plurality of band images indicating a frequency component for each of a plurality of frequency bands with respect to the first radiation image G1. FIG. 3 is a diagram illustrating frequency resolution performed by the first frequency analysis unit 32. First, the first frequency analysis unit 32 performs a filtering process with respect to the first radiation image G1 using a Gaussian filter of $\sigma=1$, for example, to reduce the size of the first radiation image G1 into ½ to thereby generate a reduced image G1-1 which is a Gaussian component. The reduced image G1-1 refers to an image obtained by reducing the size of the first radiation image G1 into ½. In the following description, the first radiation image G1 may be referred to as a first radiation image G1-0, for ease of description. Then, the first frequency analysis unit 32 performs interpolation calculation such as cubic B-spline interpolation to magnify the reduced image G1-1 two times to have the same size as that of the first radiation image G1, and subtracts the reduced image G1-1 from the first radiation image G1 to generate a band image F1-0 which is a Laplacian component of a highest frequency band. In this embodiment, the highest frequency band is referred to as a 0-th frequency band, for ease of description.

Then, the first frequency analysis unit 32 performs a filtering process with respect to the reduced image G1-1 using the Gaussian filter of $\sigma=1$ to reduce the size of the reduced image G1-1 into ½ to thereby generate a reduced image G1-2, magnifies the reduced image G1-2 two times to have the same size as that of the reduced image G1-1, and subtracts the magnified reduced image G1-2 from the reduced image G1-1 to generate a band image F1-1 of a first frequency band. Further, by repeating the above processes until a band image of a desired frequency band is generated, band images F1-$k$ ($k=0$ to a in which a is the number of bands) of a plurality of frequency bands are generated. Thus, a reduced image G1-(a+1) of a lowest frequency is also generated.

Here, a signal value of each pixel of a reduced image represents the density of the pixel, and a signal value of each pixel of the band images F1-$k$ represents the size of a frequency component of a corresponding frequency band in the pixel. By using another multiple resolution conversion method such as wavelet conversion, a plurality of band images F1-$k$ with different frequency bands may be generated.

The first frequency analysis unit 32 generates each band image from the highest frequency band to a predetermined frequency band as the first high-frequency component GH1. In this embodiment, the first frequency analysis unit 32 generates the first high-frequency component GH1 of a frequency band according to an imaging portion of the subject H. For example, in a case where the chest portion is an imaging portion, a region of maximum interest corresponds to pulmonary blood vessels. Thus, in a case where the chest portion is the imaging portion, the first frequency analysis unit 32 generates each band image from the highest frequency band to a frequency band including information on pulmonary blood vessels as the first high-frequency component GH1. Further, in a case where the imaging portion is a lumbar spine or a hip joint shaft portion, since a bone portion such as a joint which is a structure larger than pulmonary blood vessels becomes a region of maximum interest, each band image from the highest frequency band to a frequency band lower than that of the pulmonary blood vessels is generated as the first high-frequency component GH1. A relationship between an imaging portion and a frequency band generated as the first high-frequency component GH1 is generated in advance and is stored in the storage 23. The first frequency analysis unit 32 determines a frequency band of a band image to be generated with reference to the relationship stored in the storage 23 on the basis of information on the imaging portion input from the input unit 9 to generate the first high-frequency component GH1.

The first frequency analysis unit 32 may generate band images and reduced images of a plurality of frequency bands, and may select, as the first high-frequency component GH1, each band image up to a frequency band according to an imaging portion from the band images of the plurality of frequency bands.

The second frequency analysis unit 33 generates a second high-frequency component GH2 and a second low-frequency component GL2 which are a high-frequency component and a low-frequency component of the second radiation image G2 acquired by the second radiation detector 6. Similar to the first frequency analysis unit 32, the second frequency analysis unit 33 generates each band image from a highest frequency band to a predetermined frequency band, determined according to an imaging portion, as the second high-frequency component GH2. The second high-frequency component GH2 becomes a band image up to the same frequency band as that of the first high-frequency component GH1. Further, the second low-frequency component GL2 is generated together with the second high-frequency component GH2. The second low-frequency component GL2 is a reduced image used in a case where a band image of a lowest frequency band included in the second high-frequency component GH2 is generated. For example, in a case where a band image F2-2 up to the second frequency band is generated as the second high-frequency component GH2, the second low-frequency component GL2 becomes a reduced image G2-3.

The second frequency analysis unit 33 may generate band images and reduced images of a plurality of frequency bands, may select a band image up to a frequency band according to an imaging portion, that is, a band image of a frequency band included in the first high-frequency component GH1 from the band images of the plurality of frequency bands, and may set the selected band image as the second high-frequency component GH2. In this case, a reduced image used in a case where a band image of a lowest frequency band included in the second high-frequency component GH2 is generated may be selected as the second low-frequency component GL2.

The addition processing unit 34 performs weighting and addition between corresponding pixels with respect to the first high-frequency component GH1 and the second high-frequency component GH2 to generate an addition high-frequency component GHa. Specifically, the addition high-frequency component GHa is calculated by Expression (1).

$$GHa = \alpha1 \cdot GH1 + \alpha2 \cdot GH2 \quad (1)$$

Figure 4:
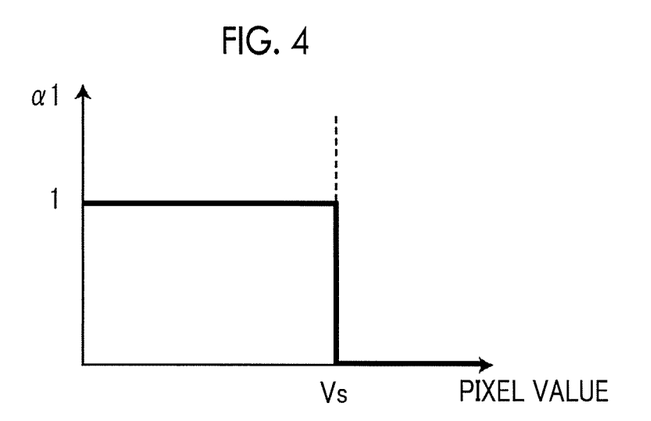
FIG. 4 is a diagram illustrating a weighting coefficient.
Figure 5:
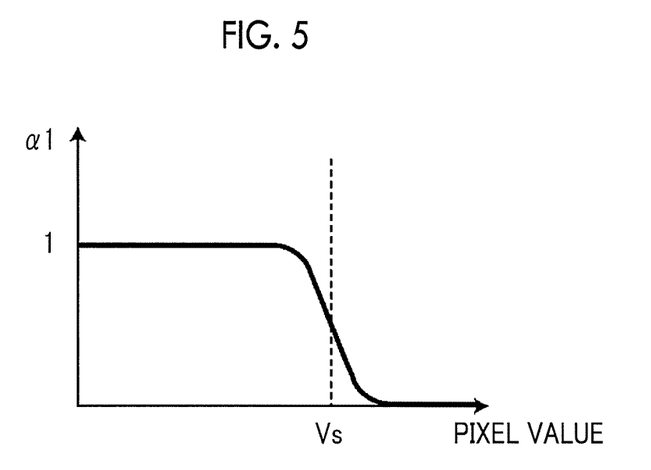
FIG. 5 is a diagram illustrating a weighting coefficient.

Here, $\alpha1$ and $\alpha2$ are weighting coefficients, and $\alpha1+\alpha2=1$. The weighting coefficients $\alpha1$ and $\alpha2$ are set on the basis of the first radiation image G1. That is, the addition processing unit 34 detects a pixel having a saturated pixel value Vs which is a pixel value that is saturated to be crushed to black in the first radiation image G1, in displaying the first radiation image G1 on the display unit 8, as a saturated pixel of which the pixel value is saturated. Further, using the saturated pixel value Vs as a threshold value, the addition processing unit 34 sets $\alpha1=1$ and $\alpha2=0$ with respect to a pixel having a pixel value that is equal to or smaller than the saturated pixel value Vs in the first radiation image G1, and sets $\alpha1=0$ and $\alpha2=1$ with respect to a pixel having a pixel value that exceeds the saturated pixel value Vs in the first radiation image G1. FIG. 4 is a diagram showing the weighting coefficient $\alpha1$. As shown in FIG. 5, in the vicinity of the saturated pixel value Vs, the weighting coefficient $\alpha1$ may be gradually changed.

In a case where the first and second high-frequency components GH1 and GH2 include band images of a plurality of frequency bands, an addition high-frequency component is generated for each frequency band.

Figure 6:
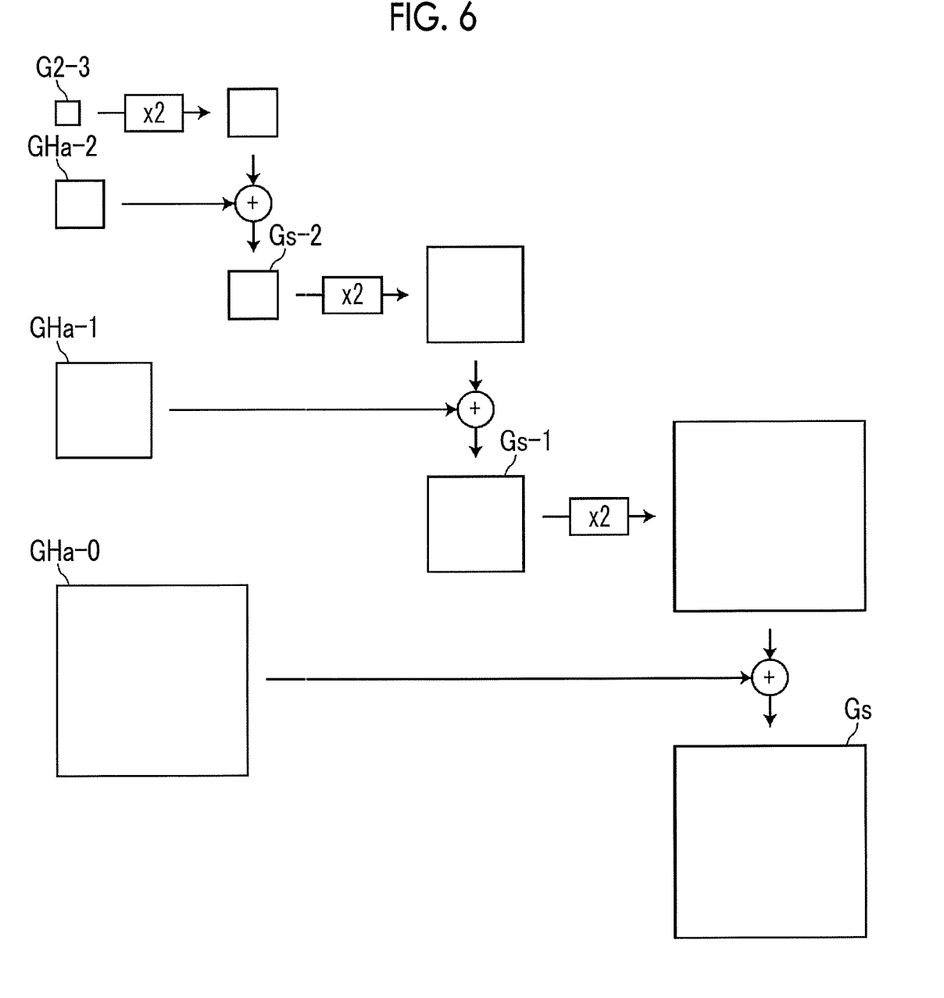
FIG. 6 is a diagram illustrating frequency synthesis performed by a synthesis unit.

The synthesis unit 35 synthesizes the addition high-frequency component GHa and the second low-frequency component GL2 to generate a processed image Gs. FIG. 6 is a diagram illustrating synthesis of the addition high-frequency component GHa and the second low-frequency component GL2. In this embodiment, synthesis means frequency synthesis. In this embodiment, band images F1-0, F1-1, F1-2, F2-0, F2-1, and F2-2 up to the second frequency band are generated as the first high-frequency components GH1 and the second high-frequency components GH2, and the reduced images G2-3 are generated as the second low-frequency components GL2. Thus, the frequency bands of the addition high-frequency components GHa become a 0-th frequency band to a second frequency band.

The synthesis unit 35 magnifies the reduced image G2-3 which is the second low-frequency component GL2 two times using interpolation calculation, and adds the reduced image G2-3 which is magnified two times to an addition high-frequency component GHa-2 of the second frequency band to generate a synthesis image Gs-2. Then, the synthesis unit 35 magnifies the synthesis image Gs-2 two times, and adds the synthesis image Gs-2 which is magnified two times to an addition high-frequency component GHa-1 of the first frequency band to generate a synthesis image Gs-1. Further, the synthesis unit 35 magnifies the synthesis image Gs-1 two times, and adds the synthesis image Gs-1 which is magnified two times to an addition high-frequency component GHa-0 of the 0-th frequency band to generate a synthesis image Gs-0, that is, a processed image Gs.

Figure 7:
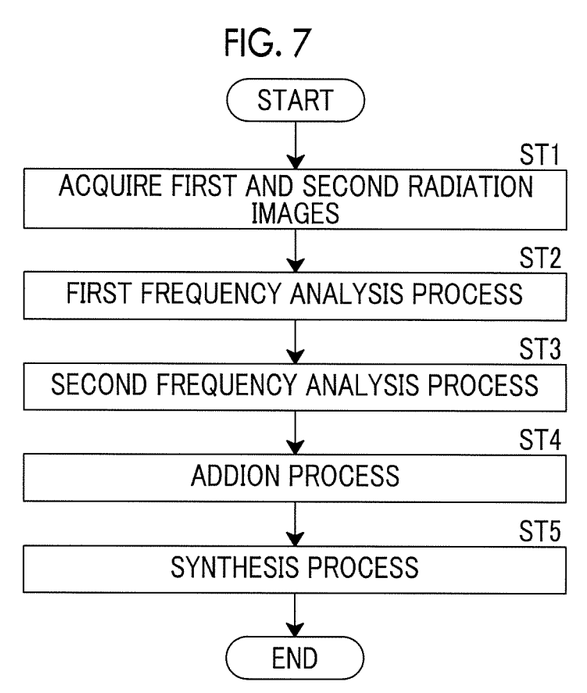
FIG. 7 is a flowchart showing processes performed in the embodiment.

Then, processes performed in the embodiment will be described. FIG. 7 is a flowchart showing processes performed in the embodiment. First, the image acquisition unit 31 acquires the first and second radiation images G1 and G2 from the first and second radiation detectors 5 and 6 (step ST1). Then, the first frequency analysis unit 32 performs a first frequency analysis process of generating the first high-frequency component GH1 which is a high-frequency component of the first radiation image G1 (step ST2), and the second frequency analysis unit 33 performs a second frequency analysis process of generating the second high-frequency component GH2 and the second low-frequency component GL2 which are a high-frequency component and a low-frequency component of the second radiation image G2 (step ST3).

Further, the addition processing unit 34 performs an addition process of pedal fling weighting and addition between corresponding pixels with respect to the first high-frequency component GH1 and the second high-frequency component GH2 to generate an addition high-frequency component GHa (step ST4). Then, the synthesis unit 35 performs a synthesis process of synthesizing the addition high-frequency component GHa and the second low-frequency component GL2 to generate the processed image Gs (step ST5), and then, the processes are terminated.

Here, since the first radiation image G1 is acquired by X-rays with a large amount of radiation, a noise component is small, but there is a possibility that pixel values are saturated to cause black crushing or halation. Thus, the first high-frequency component GH1 which is a high-frequency component of the first radiation image G1 has a small amount of noise, but information on the subject H in a portion where the pixel values are saturated is lost. On the other hand, since the second radiation image G2 is acquired by X-rays with a small amount of radiation, pixel values are not saturated, but granulation is poor in a portion where the body thickness of the subject H is large, and thus, a large amount of noise is included therein. Thus, the second high-frequency component GH2 which is a high-frequency component of the second radiation image G2 has a large amount of noise components, but information on the subject H is not lost. Accordingly, by performing weighting and addition between corresponding pixels with respect to the first high-frequency component GH1 and the second high-frequency component GH2, it is possible to set a weight of the first high-frequency component GH1 to be smaller than that of the second high-frequency component GH2 in a pixel that is saturated in the first radiation image G1, and to set the weight of the first high-frequency component GH1 to be larger than that of the second high-frequency component GH2 in pixels other than the above-mentioned pixel.

Thus, it is possible to enlarge a dynamic range of the first radiation image G1 with respect to the amount of emitted radiation, and consequently, it is possible to generate an addition high-frequency component GHa in which loss of a high-frequency component due to saturation is reduced, having a small amount of noise components. Further, by synthesizing the addition high-frequency component GHa and the second low-frequency component GL2, it is possible to generate a processed image Gs having both of an advantage of the first radiation image G1 and an advantage of the second radiation image G2, that is, having a wide observable density range, with a small amount of noise in a pixel that is not saturated and with no influence due to saturation.

Particularly, by setting the weighting coefficient $\alpha1$ to 0 with respect to a pixel value corresponding to a pixel value that exceeds the saturated pixel value Vs in the first radiation image G1 and setting the weighting coefficient $\alpha1$ to 1 with respect to a pixel value corresponding to a pixel value that is equal to or smaller than the saturated pixel value Vs, with respect to the first high-frequency component GH1, it is possible to generate a processed image Gs having a wide observable density range, with a small amount of noise in a pixel that is not saturated and with no influence due to saturation.

Here, by gradually changing the weighting coefficient in the vicinity of the saturated pixel value, it is possible to prevent occurrence of artifact at a boundary of the saturated pixel value and a pixel value other than the saturated pixel value. Thus, it is possible to generate a processed image Gs with higher quality.

In the above-described embodiment, image processing is performed using radiation images acquired in a system that captures radiation images of a subject using the first and second radiation detectors 5 and 6, but even in a case where the first and second radiation images G1 and G2 are acquired using a storage phosphor sheet as detection unit, the invention may be similarly applied thereto. In this case, two storage phosphor sheets disposed in an overlapping manner may be irradiated with X-rays that pass through the subject H, information on a radiation image of the subject H may be stored and recorded on each storage phosphor sheet, the information on the radiation image may be photoelectrically read from each storage phosphor sheet, and thus, the first and second radiation images G1 and G2 may be acquired.

In addition, in the above-described embodiment, the weighting coefficients $\alpha 1$ and $\alpha 2$ are set on the basis of pixel values of the first radiation image G1, but the weighting coefficients may be determined on the basis of characteristics of the detection unit for acquiring the first radiation image G1. For example, a storage phosphor sheet has low sensitivity, but has a wide dynamic range, in which the amount of radiation corresponding to the saturated pixel value Vs is 100 mR. On the other hand, the radiation detector has high sensitivity, but has a narrow dynamic range, in which the amount of radiation corresponding to the saturated pixel value Vs is 10 mR. Accordingly, the weighting coefficients may be determined on the basis of the characteristics of the detection unit. Specifically, the value of the saturated pixel value Vs in FIGS. 4 and 5 may be changed according to the characteristics of the detection unit. Thus, it is possible to generate a processed image Gs having a wide observable density range with no influence due to saturation, in consideration of the characteristics of the detection unit.

In the above-described embodiment, the first high-frequency component GH1, the second high-frequency component GH2, and the second low-frequency component GL2 are generated through frequency resolution, but the first high-frequency component GH1, the second high-frequency component GH2, and the second low-frequency component GL2 may be generated using a filtering process of a high pass filter, or the like. In a case where the first high-frequency component GH1, the second high-frequency component GH2, and the second low-frequency component GL2 are generated using the filtering process, the synthesis unit 35 may add the second low-frequency component GL2 to the addition high-frequency component GHa to generate the processed image Gs.

In the above-described embodiment, the first and second radiation images G1 and G2 are acquired using a one-shot method, but the first and second radiation images G1 and G2 may be acquired using a so-called two-shot method in which imaging is performed two times. In a case where the two-shot method is performed, in order to reduce an exposure dose to the subject H, the amount of radiation emitted to the subject H in the first imaging is reduced compared with the second imaging. Thus, the second radiation image G2 acquired by the second imaging has a large amount of noise due to a shortage of the amount of radiation, although loss of information on a subject due to black crushing, or the like, as in the second radiation image G2 acquired by the one-shot method, does not occur. Accordingly, by performing the same processes as those in the above-described embodiment with respect to the first and second radiation images G1 and G2 acquired by the two-shot method, it is possible to generate a processed image Gs having a wide observable density range, with a small amount of noise in a pixel that is not saturated and with no influence due to saturation.

Hereinafter, effects of the embodiments will be described.

By setting a weighting coefficient in performing weighting and addition on the basis of a pixel value of a first radiation image, it is possible to set a weight of a first high-frequency component to be smaller than that of a second high-frequency component with respect to a pixel that is saturated in the first radiation image, and to set a weight of the first high-frequency component to be larger than that of the second high-frequency component with respect to pixels other than the above-mentioned pixel. Accordingly, it is possible to generate a processed image having a wide observable density range, with a small amount of noise in a pixel that is not saturated and with no influence due to saturation.

By setting a weighting coefficient to 0 with respect to a pixel value corresponding to a pixel value that exceeds a saturated pixel value in the first radiation image and setting a weighting coefficient to 1 with respect to a pixel value corresponding to a pixel value that is equal to or smaller the saturated pixel value in the first radiation image, with respect to the first high-frequency component, it is possible to generate a processed image having a wide observable density range, with a small amount of noise in a pixel that is not saturated and with no influence due to saturation.

By gradually changing a weighting coefficient in the vicinity of the saturated pixel value, it is possible to prevent occurrence of artifact at a boundary of the saturated pixel value and a pixel value other than the saturated pixel value. Thus, it is possible to generate a processed image Gs with higher quality.

What is claimed is:

1. An image processing apparatus comprising:
a processor configured to
acquire two radiation images obtained by radiation rays passed through a subject, having different amounts of radiation,
generate a first high-frequency component which is a high-frequency component of a first radiation image acquired by radiation having a large amount of radiation among the two radiation images,
generate a second high-frequency component which is a high-frequency component of a second radiation image acquired by radiation having a small amount of radiation among the two radiation images and a second low-frequency component which is a low-frequency component of the second radiation image,
perform weighting and addition between corresponding pixels with respect to the first high-frequency component and the second high-frequency component to generate an addition high-frequency component, and
synthesis the addition high-frequency component and the second low-frequency component to generate a processed image.

2. The image processing apparatus according to claim 1, wherein the processor sets a weighting coefficient in performing the weighting and addition on the basis of a pixel value of the first radiation image.

3. The image processing apparatus according to claim 2, wherein the processor sets the weighting coefficient to 0 with respect to a pixel value corresponding to a pixel value that exceeds a saturated pixel value in the first radiation image and sets the weighting coefficient to 1 with respect to a pixel value corresponding to a pixel value that is equal to or smaller the saturated pixel value in the first radiation image, with respect to the first high-frequency component.

4. The image processing apparatus according to claim 3, wherein the processor gradually changes the weighting coefficient in the vicinity of the saturated pixel value.

5. The image processing apparatus according to claim 1, wherein the processor sets the weighting coefficient in performing the weighting and addition on the basis of a characteristic of a radiation detector for acquiring the first radiation image.

6. The image processing apparatus according to claim 1, wherein the processor generates the first high-frequency component in a frequency band according to an imaging portion of the subject, and
wherein the processor generates the second high-frequency component and the second low-frequency component in a frequency band according to an imaging portion of the subject.

7. An image processing method comprising:
acquiring two radiation images obtained by radiation rays passed through a subject, having different amounts of radiation;
generating a first high-frequency component which is a high-frequency component of a first radiation image acquired by radiation having a large amount of radiation among the two radiation images;
generating a second high-frequency component which is a high-frequency component of a second radiation image acquired by radiation having a small amount of radiation among the two radiation images and a second low-frequency component which is a low-frequency component of the second radiation image;
performing weighting and addition between corresponding pixels with respect to the first high-frequency component and the second high-frequency component to generate an addition high-frequency component; and
synthesizing the addition high-frequency component and the second low-frequency component to generate a processed image.

8. A non-transitory computer-readable recording medium having stored therein an image processing program that causes a computer to execute:
a process of acquiring two radiation images obtained by radiation rays passed through a subject, having different amounts of radiation;
a process of generating a first high-frequency component which is a high-frequency component of a first radiation image acquired by radiation having a large amount of radiation among the two radiation images;
a process of generating a second high-frequency component which is a high-frequency component of a second radiation image acquired by radiation having a small amount of radiation among the two radiation images and a second low-frequency component which is a low-frequency component of the second radiation image;
a process of performing weighting and addition between corresponding pixels with respect to the first high-frequency component and the second high-frequency component to generate an addition high-frequency component; and
a process of synthesizing the addition high-frequency component and the second low-frequency component to generate a processed image.

* * * * *